United States Patent [19]

Horner et al.

[11] 4,398,792
[45] Aug. 16, 1983

[54] HOLOGRAPHIC COUPLER FOR FIBER OPTIC SYSTEMS

[75] Inventors: Joseph L. Horner, Cambridge; Jacques E. Ludman, Westford, both of Mass.

[73] Assignee: The United States of America as represented by the Secretary of the Air Force, Washington, D.C.

[21] Appl. No.: 231,088

[22] Filed: Feb. 3, 1981

[51] Int. Cl.³ .............................................. G02B 7/26
[52] U.S. Cl. ............................ 350/96.19; 350/3.70; 350/96.20
[58] Field of Search ........................ 350/3.6, 3.7, 3.72, 350/3.83, 3.84, 96.17, 96.19, 96.20

[56] References Cited

U.S. PATENT DOCUMENTS

| | | | |
|---|---|---|---|
| 3,506,327 | 4/1970 | Leith et al. | 350/3.5 |
| 3,586,412 | 6/1971 | Leith | 350/3.5 |
| 3,666,345 | 5/1972 | Maslowski | 350/3.5 |
| 3,864,016 | 2/1975 | Dakss et al. | 350/96 WG |
| 3,885,856 | 5/1975 | Ostrowsky et al. | 350/3.5 |
| 3,975,082 | 8/1976 | Winzer | 350/96.19 |
| 4,054,356 | 10/1977 | Noguchi | 350/3.5 |
| 4,057,319 | 11/1977 | Ash et al. | 350/96.19 X |
| 4,306,763 | 12/1981 | Huignard | 350/3.72 |
| 4,310,216 | 1/1982 | Pellaux | 350/3.72 |
| 4,337,993 | 7/1982 | Kompfner | 350/96.19 |

OTHER PUBLICATIONS

Leite et al., "Optical-Fibre-Bundle Holographic Coupler," M'Waves, Optics & Acoustics, vol. 2, No. 2, Mar. 1978, pp. 45-54.
Nishihara, H. et al., "Holocoupler: A Novel Coupler for Optical Circuits," IEEE Journal of Quantum Electronics, Sep. 1975, pp. 794-796.
Thyagarajan, K. et al., "Efficient Coupling of Incoherent Light Into Optical Fibers and Bundles," Applied Optics, vol. 17, No. 15, Aug. 1, 1978, pp. 2416-2419.
Kogelnik, Herwig, "Coupled Wave Theory for Thick Hologram Gratings," The Bell System Technical Journal, vol. 48, No. 9, Nov. 1969, pp. 2909-2947.
Kogelnik, H. et al., "Holographic Thin Film Couplers," The Bell System Technical Journal, vol. 49, No. 7, Sep. 1970, pp. 1602-1608.
Cohen, L. G. et al., "Microlenses for Coupling Junction Lasers to Optical Fibers," Applied Optics, vol. 13, No. 1, Jan. 1974, pp. 89-94.
Latta, M. R., "Design Techniques for Forming 488-nm Holographic Lenses with Reconstruction at 633 nm.", Applied Optics, vol. 18, No. 14, Jul. 15, 1979, pp. 2418-2421.

Primary Examiner—John D. Lee
Attorney, Agent, or Firm—Donald J. Singer; Jacob N. Erlich

[57] ABSTRACT

A holographic coupler for fiber optic systems having a holographic element utilized in conjunction with an optical source and an optical fiber in order to direct and couple the beam emanating from the optical source into the fiber. The holographic element, source and optical fiber have the same relative position with respect to each other as (1), a photosensitive medium, (2) a means for sizing and shaping a beam of temporally and spatially coherent radiation to the same geometry as the optical source before the beam impinges upon the photosensitive medium, and (3) the focal point of a converging beam of temporally and spatially coherent radiation impinging upon the photosensitive medium during the making of the holographic element used with the coupler.

4 Claims, 4 Drawing Figures

FIG.2

HOLOGRAPHIC COUPLER FOR FIBER OPTIC SYSTEMS

STATEMENT OF GOVERNMENT INTEREST

The invention described herein may be manufactured and used by or for the Government for governmental purposes without the payment of any royalty thereon.

BACKGROUND OF THE INVENTION

This invention relates generally to fiber optic communications systems, and, more particularly, to a holographic coupler for coupling, with high efficiency, the output of an optical source, such as a laser diode, into an optical fiber.

The use of fiber optics in communications and data transmission is now rapidly gaining momentum. In fact, several dozen such links have already been installed by major communications corporations. The technology is moving out of the laboratory into the field. The appeal of fiber optic links is largely due to their inherently large bandwidth capabilities, combined with their small size (several orders of magnitude smaller than conventional coaxial cables), and immunity to noise, jamming, and electromagnetic interference.

The laser plays an important part in these systems. Because of its small size and ease of modulation it is typically used as the optical source for the fiber optic cable. These lasers are usually solid state junction lasers whose emitting surface is a stripe typically $1\mu$ meter by $10\mu$ meters. The optical fibers used have a round geometry, ranging from a few $\mu$ meters in diameter for monomode fibers, to $100\mu$ meters for a multimode optical fiber. Although the dimensions of the laser sources and the fibers are roughly the same, there exists a basic need for an efficient means of coupling the light from the source to the fiber. For example, a recent study of commercially available devices (Electronic Design Magazine, Vol. 28, p. 34, January 1980) showed that the best such devices are only 15% efficient, and the average of such devices were 4.6% efficient. In short, most of the light is wasted. This means that in a long communications link, many more repeater stations are required to compensate for this loss, thus adding to the cost, complexity, while reducing the reliability of the link.

Many of the devices utilized to date are basically lenses. For example, Cohen and Schneider in *Applied Optics*, January 1974, page 89, describe a micro lens fabricated on the end of the fiber, or the end of the source. An efficiency of 30% is quoted. The major disadvantages of such a device are, because of their extremely small size, the difficulty with which they are fabricated and the hypercritical nature of the alignment between the source and the fiber. For instance, a $3\mu$ meter displacement will cause a 50% loss in coupling efficiency, a tolerance difficult to adhere to in the field. Another system proposed by Thyagarajan and set forth in *Applied Optics*, Vol. 17, 1978 p. 2416, uses a parabolic shaped collector to gather the light and direct it into the fiber. But the same disadvantages set forth above are inherent therein: difficulty of fabrication due to small size and highly critical alignment.

Consequently, there exists a fundamental problem in using a simple lens for this application. A lens is basically an imaging device. It works poorly as an efficient light gathering device. The reasons for this is that in order to gather a large portion of light, the source must be placed close to the lens so that the lens subtends a large angle relative to the source. However, with available refractive indices, such a configuration does not allow the light to be focused. The light gathering ability of a lens is related to the so-called F number of the lens, and F numbers of much less than 1 are not practical. Even a perfect F/1 lens will only collect 20% of the light from a uniform Lambertian point source. Further, if one tries to use a lens as an imaging device, a basic mismatch exists in imaging the stripe geometry of a diode laser onto the round geometry of the optical fiber.

It is therefore readily apparent in the fiber optic field that a need arises for a nonlens-like device which is capable of efficiently and reliably coupling the output of an optical source into an optical fiber.

SUMMARY OF THE INVENTION

The instant invention overcomes the problems encountered in the past by providing a device which utilizes a holographically formed element to gather light from a partially coherent source, such as a laser diode or LED (light emitting diode), and direct this light into an optical fiber.

The holographic coupler for fiber optic systems of this invention incorporates therein a holographic element capable of operating either in transmission or reflection. The element is made by a holographic technique utilizing a photosensitive medium having sufficient thickness so as to achieve a high diffraction efficiency as well as a broad bandwidth of operation. In addition, the photosensitive medium must be capable of high resolution in order to record the high density of optical fringes necessary for practical operation.

In fabricating the tranmissive holographic element utilized with this invention a pair of temporally and spatially coherent beams of electromagnetic radiation are made to interfere within the photosensitive medium. Preferably both beams are derived from the same source of electromagnetic radiation and form two separate paths of substantially identical lengths.

One of the beams is expanded by means of conventional beam expanding-collimating means which renders the beam spatially homogeneous and parallel. The light in this path then passes through a convergent lens in order to converge the beam focusing it to a point located behind the photosensitive medium. The other beam is formed by passing through an aperture plate. The shape of the aperture plate is chosen to have the exact same geometry as the source that will be used in the fiber optic system utilized with this invention. This beam impinges upon the side of the photosensitive medium opposite the focus point of the first beam. Thereafter, the photosensitive medium is developed by conventional methods thereby producing the desired holographic element.

In fabricating the reflective version of the holographic element utilized in the optical coupler of this invention the beam which passes through the aperture plate impinges upon the same side of the photosensitive medium as the focus point of the converging beam. This is accomplished by appropriate focusing means which direct the other beam into the same side of the photosensitive medium as the focus point of the converging beam. As with the transmissive element, the photosensitive medium is developed by conventional methods appropriate to the photosensitive medium in order to produce the reflective holographic element to be subsequently used in the holographic coupler of this invention.

Both the transmissive and reflective holographic coupler of this invention are made up of a fixture or housing which mounts therein the holographic element, a source (in the form of, for example, a laser diode), and the optical fiber into which the output of the source is to be coupled. The source is secured within the housing or fixture in substantially the same position with respect to the holographic element as the position occupied by the aperture plate with respect to the photosensitive medium during making of the holographic element. The end of the optical fiber is placed within the housing in the same position with respect to the holographic element as the focus point of the beam which passes through the photosensitive medium during the production of the holographic element. Suitable alignment means are incorporated within the fixture or housing in order to insure that the focus spot from the holographic element falls on the center of the optical fiber. In so doing, a holographic coupler for fiber optic systems is produced which is substantially more reliable, effective and less expensive than couplers of the past.

It is therefore an object of this invention to provide a holographic coupler which is capable of efficiently coupling the output of an optical source into an optical fiber.

It is another object of this invention to provide a holographic coupler for fiber optic systems which avoids all the problems of microcircuit fabrication and yet is small in size.

It is a further object of this invention to provide a holographic coupler for fiber optic systems which readily accepts the realignment and replacement of fiber, source or holographic element in the field without elaborate procedures.

It is still a further object of this invention to provide a holographic coupler for fiber optic systems which can be made impervious to moisture, pollution and substantially all other environmental effects.

It is still another object of this invention to provide a holographic coupler for fiber optic systems which is economical to produce and which utilizes conventional, currently available materials that lend themselves to standard mass producing manufacturing techniques.

For a better understanding of the present invention, together with other and further objects thereof, reference is now made to the following description taken in conjunction with the accompanying drawing and its scope will be pointed out in the appended claims.

DETAILED DESCRIPTION OF THE DRAWING

FIG. 2 is a side elevational view, shown partly in cross section, of the housing for the transmissive holographic coupler of this invention;

DETAILED DESCRIPTION OF THE PREFERRED EMBODIMENTS

Figure 3:
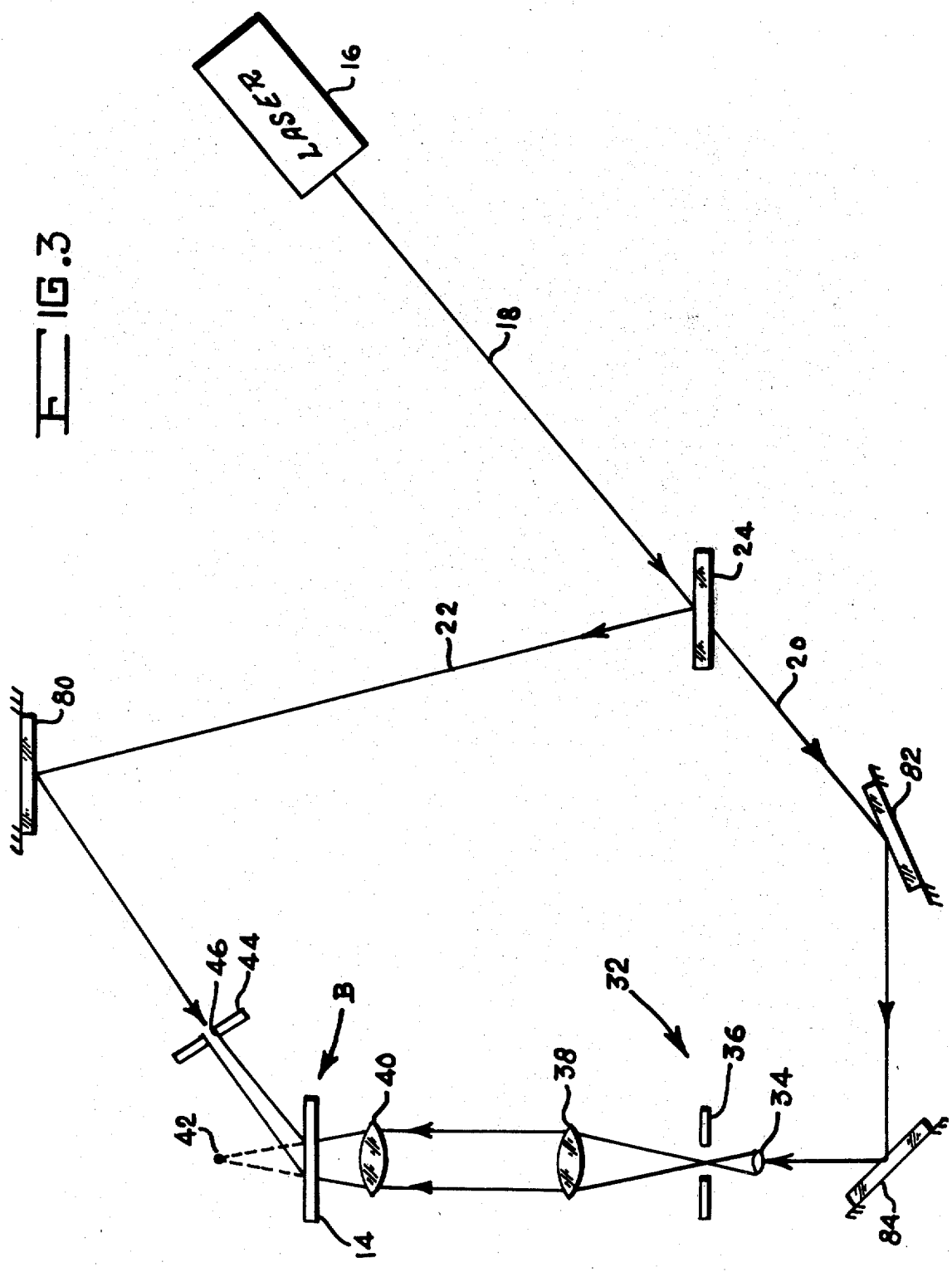
FIG. 3 is a schematic representation of a technique for producing the holographic element of the reflective holographic coupler of this invention.

In order to fully understand the embodiments of this invention, it is first necessary to describe the technique for producing the halographic element utilized with the holographic coupler for fiber optic systems of this invention. Since this invention is divided into two types of couplers, FIG. 1 will be referred to for illustrating the fabrication procedure or technique for producing the transmissive holographic element A utilized with the transmissive coupler 10 depicted in FIG. 2 of the drawing. FIG. 3 of the drawing will be referred to for illustrating the technique of producing the reflective holographic element B utilized with the reflective coupler 12 depicted in FIG. 4 of the drawing. It should be noted, however, that even though the transmissive and reflective holographic couplers 10 and 12 form different embodiments of this invention, the techniques for producing and using both of the couplers 10 and 12 are substantially similar. Therefore, for purposes of clarity and ease of understanding of the invention, identical elements illustrated in FIGS. 1–4 of the drawing will be designated by the same reference numerals.

Figure 1:
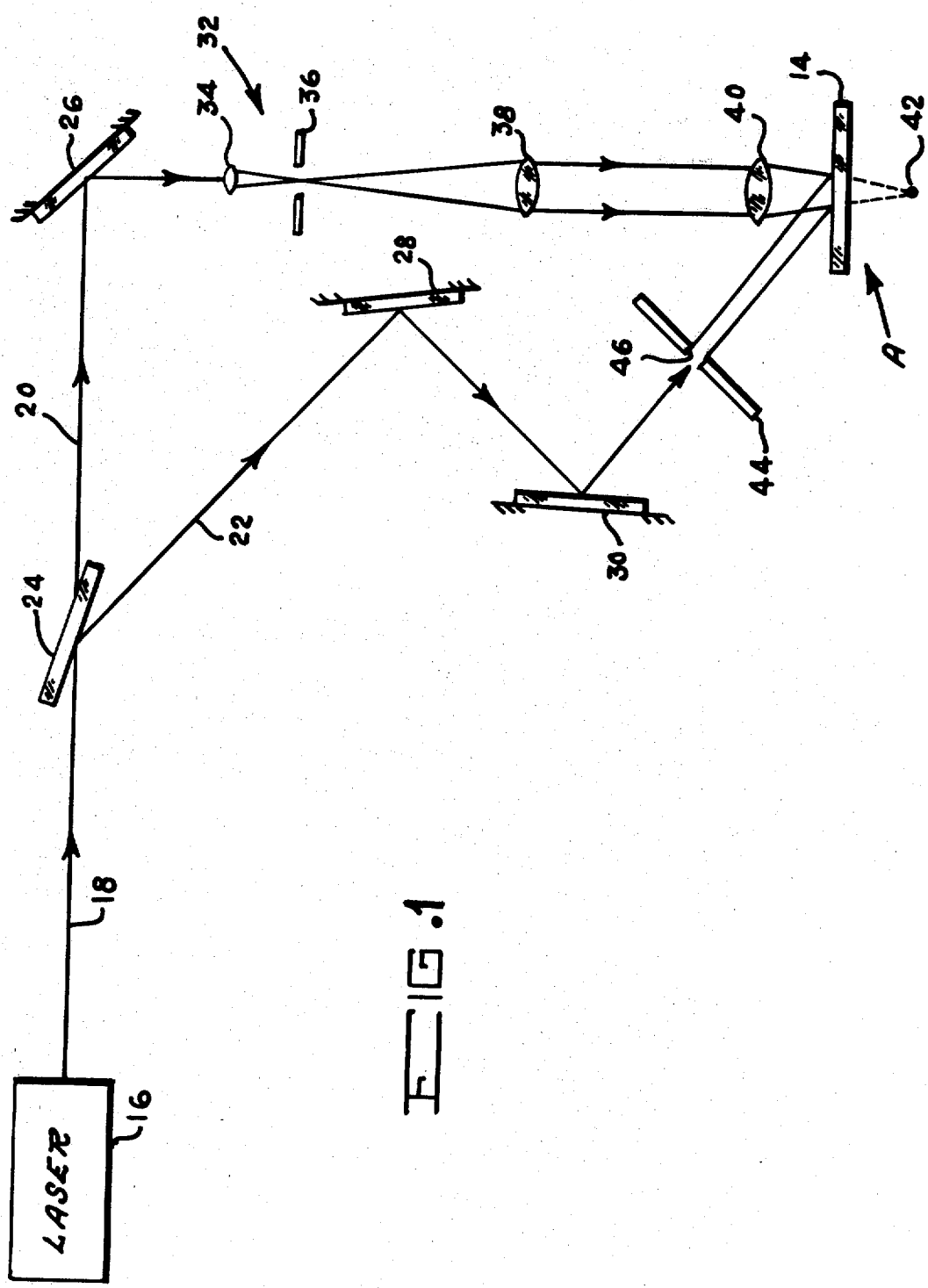
FIG. 1 is a schematic representation of a technique for producing the holographic element utilized with the transmissive holographic coupler of this invention.

Reference is now made to FIG. 1 of the drawing in order to fully describe the technique which may be utilized to produce the transmissive holographic element A utilized with this invention. This procedure incorporates therein the utilization of a photosensitive medium 14 described more fully in detail hereinbelow and any conventional source of temporally and spatially coherent monochromatic electromagnetic radiation 16. This source of electromagnetic radiation 16 is preferably in the form of a laser, and is chosen to operate in a region of adequate sensitivity of the photosensitive medium 14, and relatively close to the wavelength of the source to be utilized from the fiber optic system with which the holographic coupler 10 of this invention is deployed. These two desiderata are not always possible in the IR region of the spectrum centered around 0.8 micrometers or 1.2 micrometers where current fiber optic systems are operated. Techniques are, however, available for fabricating holograms at one wavelength for use at a substantially different wavelength.

The photosensitive medium 14 can be in the form of, for example, a photographic emulsion, a photoresist film or a dichromated gelatin coating or the like. The specific choice depends upon the properties needed for a specific application of this invention. Furthermore, photosensitive medium 14 is made of sufficient thickness to achieve a high diffraction efficiency (i.e. 80%) and yet not so thick that it will have too narrow a bandwidth of operation.

Still referring to FIG. 1 of the drawing, laser 16 is illustrated producing a beam 18 of electromagnetic radiation. Beam 18 is divided into two portions or paths, hereinafter referred to as beams 20 and 22, by any convenient beam dividing mean, such as a conventional beamsplitter 24. Additionally, in the method of fabricating the transmissive holographic element A as illustrated in FIG. 1, the path lengths of beams 20 and 22 are made substantially equal to provide an interference between beams 20 and 22 within photosensitive medium 14. The substantially identical path lengths of beams 20 and 22 are achieved in the set up shown by the appropriate placing of any suitable directing element such as mirrors 28 and 30 within the path of beam 22.

Referring now to the path of beam 20, beam 20 after being directed from mirror 26 passes through a conventional beam expanding-collimating means 32 typically in the form of a microscope objective lens 34, a pinhole spatial filter 36 of a few micrometers aperture, and a collimating lens 38. The purpose of the beam expanding-collimating means 32 is to expand beam 20 and render it spatially homogenous and parallel. The light in this path then passes through a conventional convergent lens 40 thereby converging beam 20 in order to focus it to a point 42 behind photosensitive medium 14 on which the hologram is to be produced.

Beam 22 after being directed from mirrors 28 and 30 illuminates a device capable of conforming the size of beam 22 to the geometry of the source which will be utilized with the fiber optic system. Such a device can be in the form of an aperture plate 44 situated within the path of beam 22. Aperture plate 44 can be formed by standard micro-photolithographic techniques known in the field. The shape of the aperture 46 within aperture plate 44 is chosen to have the exact same geometry as the source which will be used in the fiber optic system with which holographic coupler 10 of this invention is utilized. If, for example, this is a solid state stripe geometry IR laser diode, aperture 46 would be on the order of 1 micrometers by 10 micrometers. After passing through aperture 46 beam 22 impinges upon photosensitive medium 14.

Judicious choice of an angular relationship between beams 20 and 22 assists in lowering reflection losses while obtaining high dispersion and reasonable beam intensities throughout the interference region. The ratios of the two beam intensities will preferably be unity at the center of the pattern. The use of identical path lengths for beams 20 and 22 insures both a high coherence between the two beams and a high modulation of the interference fringes.

The converging beam 20 and beam 22 meet and interfere within photosensitive medium 14 thereby exposing photosensitive medium 14. For example, using a dichromated gelatin film about 15 micrometers in thickness as the photosensitive medium 14, an exposure would be chosen so as to yield maximum diffraction efficiency. Generally, diffraction efficiency is measured by dividing light intensity in focused spot 42 by the light intensity emerging from aperture 46. Thereafter appropriate, conventional development of photosensitive medium 14 records the resultant fringe pattern in the medium thereby producing holographic element A as illustrated in FIG. 2 of the drawing.

Figure 2:
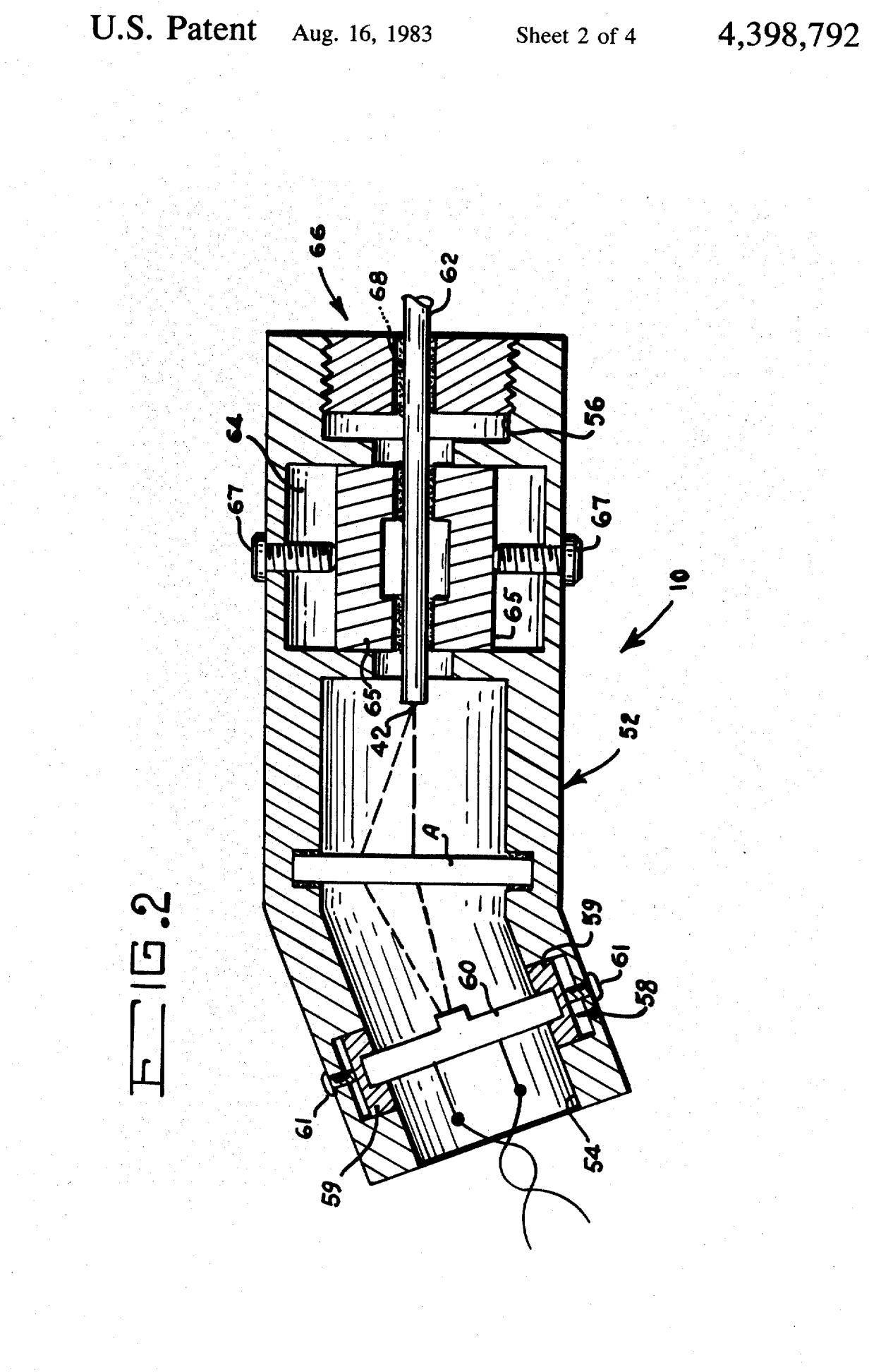

Reference is now made to FIG. 2 of the drawing which clearly illustrates the components which make up the transmissive holographic coupler 10 of this invention. Transmissive holographic coupler 10 is formed of a housing or fixture 52 which is open at both ends 54 and 56 thereof. More specifically, juxtaposed end 54 is mounted in any suitable adjustable mounting arrangement 58 any conventional optical source such as, for example, laser diode 60. The adjustable mount 58, although not limited to the design shown in FIG. 2, may be made of a pair of movable clamps 59 and set screws 61. Located adjacent laser diode 60 and fixedly secured within housing 52 is the transmissive holographic element A. Completing holographic coupler 10 of this invention is the optical fiber 62 which is mounted within housing 52 at the other end 56 thereof by any conventional adjustable securing assembly 64 and retainer 66. Adjustable securing assembly 64, although not limited to the design shown, may be made of a pair of movable fiber holding pads 65 and set screws 67. Retainer 66 encompasses fiber 62 and threadably engages housing 52 adjacent open end 56. After adjustment of the position of fiber 62 in a manner described in detail below any suitable sealant 68 may be injected between retainer 66 and fiber 62 for securely holding fiber 62 within retainer 66.

Mounting arrangement 58 is adjusted so that laser diode 60 is placed in substantially the same position with respect to holographic element A that aperture plate 44 had been positioned to photosensitive medium 14 during production of holographic element A as illustrated in FIG. 1. The critical part of the alignment within holographic coupler 10 is to ensure that the focus spot 42 from holographic element A and as illustrated in FIG. 1 falls on the center of the end of optical fiber 62. This alignment will have to be performed to approximately 10 micrometers (order of magnitude) and is accomplished by appropriate movement of adjustable assembly 64. The distance from the source 60 to the holographic element A and from the holographic element A to the end of optical fiber 62 need not be held to more than a millimeter.

Thereafter by principles of holography the light from laser diode 60 will be focused into fiber 62. The distances between the lens 40 and the photosensitive medium 14 as set forth in FIG. 1 as well as the focal lengths of lens 40 are chosen to be the same as the numerical aperture of fiber 62 to ensure good coupling efficiency. Therefore, operation and manufacture of the holographic coupler 10 of this invention is readily achievable with standard production line techniques.

FIG. 3 illustrates schematically an arrangement for fabricating the reflective holographic element B utilized with this invention. To avoid obvious redundancy and since the basic procedure and concept involved in the making of the reflective holographic element B of this invention is essentially the same as described hereinabove with reference to the fabrication of transmissive element B of this invention, detailed explanation of similar procedures and concepts will not be repeated.

The essential difference between the procedure utilized in the fabrication of holographic element A depicted in FIG. 1 and holographic element B shown in FIG. 3 of the drawing is the relocation of reflecting and focusing elements. For example, substantially 100% reflective mirrors, 80, 82 and 84 are provided in order that beam 22 can be directed around the back of photosensitive medium 14 so as to impinge upon the same side of photosensitive medium 14 as the focus point 42 of beam 20. Otherwise, the set up for the fabrication of the reflective holographic element B is identical to the set up depicted in FIG. 1 for the transmissive holographic element A of this invention.

In the making of holographic element B, as with element A, interference within photosensitive medium 14 takes place, in which the photosensitive medium 14 records the resultant fringe pattern. Also, similarly to the procedure set forth with respect to FIG. 1 the path lengths of beams 20 and 22 are substantially equal and can be made so by the appropriate placement of mirrors 80, 82 and 84. Subsequent exposure and development of photosensitive medium 14 in order to produce reflective holographic element B shown in FIG. 4 of the drawing is accomplished in the same manner described hereinabove with respect to the fabrication of holographic element A.

Figure 4:
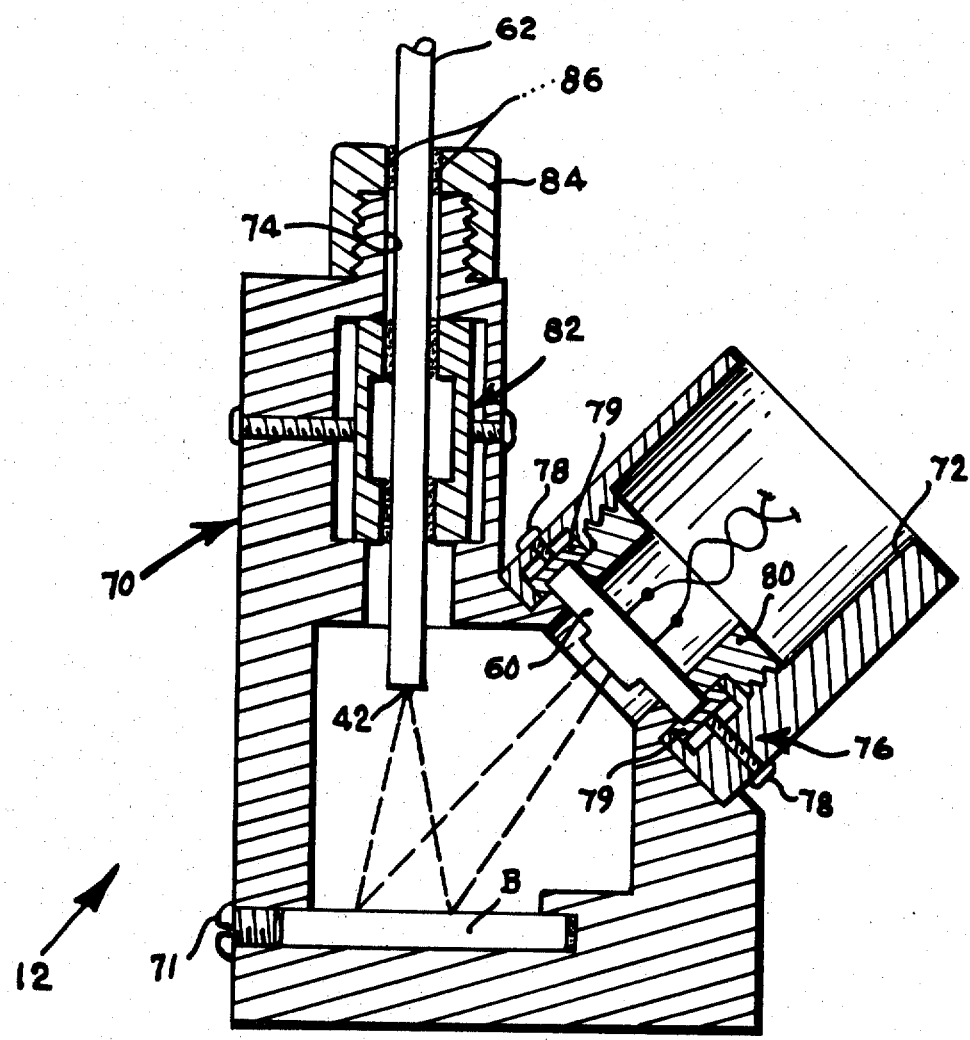
FIG. 4 is a side elevational view, shown partly in cross section, of the housing for the reflective holographic coupler of this invention.

Reference is now made to FIG. 4 of the drawing wherein the reflective coupler 12 of the present invention is shown. Reflective coupler 12 is formed of a housing or fixture 70 which has two open ends 72 and 74 therein. As in the transmissive holographic coupler 10 illustrated in FIG. 2 of the drawing, in one of the open ends 72 is located the conventional optical source in the form of, for example laser diode 60. A conventional adjustable mounting arrangement 76 made up of, for example, a pair of adjustable set screws 78, clamps 79 and retainer element 80 secures laser diode 60 in place. Located adjacent laser diode 60 and fixedly secured within housing 70 by any conventional plug 71 is the reflective holographic element B. Completing holographic coupler 12 is the optical fiber 62. Fiber 62 is adjustably mounted in a manner similar to that illustrated in FIG. 2 of the drawing by means of a conventional adjustable securing assembly 82 and retainer 84. Retainer 84 threadably engages housing 70 adjacent open end 74. After appropriate adjustment of the position of fiber 62 any suitable sealant 86 may be injected between retainer 84 and fiber 62.

It should be noted that in the reflective optical coupler 12 of this invention both the optical source or laser diode 60 and optical fiber 62 are located on the same side of holographic element B. Thereafter, adjustment of the holographic coupler 12 is similar to the adjustment of coupler 10. The laser diode 60 is placed in substantially the same position with respect to holographic element B as the aperture plate 44 had been positioned relative to photosensitive medium 14 (illustrated in FIG. 3) during the production of reflective holographic element B. The critical alignment of holographic coupler 12 is the relationship between the end of optical fiber 62 and the focal spot 42 from holographic element B. It must fall near the center of the optical fiber 62. This alignment is accomplished by means of adjustable securing assembly 82 and retainer 84. Thereafter by principles of holography the light from laser diode 60 will be focused into fiber 62.

Although this invention has been described with reference to a particular embodiment, it will be understood to those skilled in the art that this invention is also capable of a variety of further embodiments within the spirit and scope of the appended claims. For example, the elements which make up both the transmissive holographic coupler 10 and the reflective holographic coupler 12 can be made movable in a variety of ways as long as the basic concept that the fiber optic element be situated with one end at the focal point of the converging beam utilized in the manufacture of the element and the source be situated in the same relative position as the aperture plate in the manufacture of the holographic element.

We claim:

1. A reflective holographic coupler for coupling the output of an optical source to an optical fiber comprising:

a housing, said housing having a first opening and a second opening therein, said first and said second openings being located juxtaposed one another;

means situated adjacent said first opening for securing within said housing said optical source, means situated adjacent said second opening for securing within said housing an end of said optical fiber, both of said securing means being in the form of adjustably movable clamps;

a single holographic element, said single holographic element being secured within said housing in optical alignment with said optical source and said end of said optical fiber;

said optical source being situated within said first opening at a first preselected position with respect to said single holographic element and said end of said optical fiber being situated within said second opening at a second preselected position with respect to said single holographic element, said first and said second preselected positions being located adjacent the same side of said holographic element; and the relationship between said single holographic element, said first preselected position, and said second preselected position being substantially the same as the relationship between a photosensitive medium, a means for forming a beam of temporally and spatially coherent electromagnetic radiation having the same spatial and propagating characteristics as said optical source before said beam impinges upon said photosensitive medium, and the focal point of a converging beam of temporally and spatially coherent electromagnetic radiation which impinges upon said photosensitive medium during the making of said single holographic element from said photosensitive medium;

whereby a beam of electromagnetic radiation emitted from said optical source is directed to and coupled into said end of said optical fiber.

2. A reflective holographic coupler as defined in claim 1 wherein said optical source is a laser diode.

3. A reflective holographic coupler as defined in claim 1 wherein said optical source securing means further comprises a retainer which threadably engages said housing adjacent said first opening, and said optical fiber securing means further comprises a retainer which threadably engages said housing adjacent said second opening.

4. A method of producing a reflective holographic coupler for coupling the output of an optical source to an optical fiber comprising the following steps:

(a) producing a reflective holographic element by
  (i) providing a photosensitive medium of sufficient thickness to achieve a high diffraction efficiency of approximately 80% and a broad bandwidth of operation about a central wavelength,
  (ii) impinging a first beam of temporally and spatially coherent electromagnetic radiation at a preselected wavelength upon said photosensitive medium, said first beam following a first beam path of preselected length,
  (iii) placing means within said first beam path a preselected distance from said photosensitive medium for defining the size and shape of said first beam,
  (iv) impinging a second beam of temporally and spatially coherent electromagnetic radiation at said preselected wavelength upon said photosensitive medium in order to interfere with said first beam, said second beam being a converging beam and focusing to a point located a preselected distance from said photosensitive medium, said second beam following a second beam path of preselected length,
  (v) placing reflective elements in at least one of said beam paths in order to make said preselected length of said first beam path and said preselected length of said second beam path substantially equal;

(vi) optically aligning said first beam path and said second beam path so that said first beam and second beam impinge with each other on opposite sides of said photosensitive medium and interfere therein, (vii) maintaining an angular relationship between said first beam and said second beam so as to produce low reflection losses while obtaining substantially high dispersion throughout the interference region within said photosensitive medium, and (viii) processing said photosensitive medium in order to form said reflective holographic element;

(b) providing a source of electromagnetic radiation having an output of substantially said size and said shape of said first beam and substantially at said preselected wavelength, said source being located at a first preselected position adjacent said reflective holographic element, said first preselected position having substantially the same relationship with respect to said reflective holographic element as said means for sizing and shaping said first beam had with respect to said photosensitive medium during the production of said reflective holographic element; and (c) providing an end of an optical fiber for receiving said electromagnetic radiation from said source at a second preselected position adjacent said reflective holographic element, said second preselected position having substantially the same relationship with respect to said reflective holographic element as said focus point had with respect to said photosensitive medium during the production of said reflective holographic element;

thereby said first preselected position and said second preselected position are located adjacent the same side of said reflective holographic element.

* * * * *